US008047363B2

(12) United States Patent
Sheba et al.

(10) Patent No.: US 8,047,363 B2
(45) Date of Patent: Nov. 1, 2011

(54) MEMORY CARD HOLDER AND ORGANIZER FOR HOLDING AND ORGANIZING A PLURALITY OF PORTABLE MEMORY CARDS

(75) Inventors: Yaron Sheba, Mountain View, CA (US); Philip Lee Ly, San Jose, CA (US)

(73) Assignee: SanDisk Technologies Inc., Milpitas, CA (US)

( * ) Notice: Subject to any disclaimer, the term of this patent is extended or adjusted under 35 U.S.C. 154(b) by 0 days.

(21) Appl. No.: 12/493,134

(22) Filed: Jun. 26, 2009

(65) Prior Publication Data

US 2010/0051487 A1    Mar. 4, 2010

Related U.S. Application Data

(63) Continuation-in-part of application No. 29/310,553, filed on Aug. 26, 2008, now Pat. No. Des. 613,293.

(51) Int. Cl.
*G11B 33/02* (2006.01)
(52) U.S. Cl. .................. 206/307; 206/307.1; 206/308.3
(58) Field of Classification Search .................. 206/307, 206/307.1, 308.1, 308.3
See application file for complete search history.

(56) References Cited

U.S. PATENT DOCUMENTS

| 1,213,816 | A | 1/1917 | Ballentine |
| 1,436,484 | A | 11/1922 | Dahl |
| 1,451,279 | A | 4/1923 | Strietelmeier |
| 1,652,842 | A | 12/1927 | Tanner |
| 1,670,343 | A | 5/1928 | Clemens |
| 2,185,624 | A | 1/1940 | Beck |
| 2,334,487 | A | 11/1943 | Greenway |
| D140,900 | S | 4/1945 | Behrman |

(Continued)

FOREIGN PATENT DOCUMENTS

DE    20 2004 013 233    10/2004

(Continued)

OTHER PUBLICATIONS

Commonly-assigned, co-pending U.S. Appl. No. 29/210,553 for "Memory Card Holder," (Unpublished, filed Aug. 26, 2008).

(Continued)

*Primary Examiner* — J. Gregory Pickett
*Assistant Examiner* — King M Chu
(74) *Attorney, Agent, or Firm* — Jenkins, Wilson, Taylor & Hunt, P.A.

(57) ABSTRACT

The subject matter described herein includes a memory card holder and organizer for holding and organizing a plurality of portable memory cards. The memory card holder and organizer includes a card body having first and second memory card covering members defining first and second opposite-facing surfaces and first and second opposite-facing lateral edges. The card body defines a plurality of memory card insertion and holding slots for insertion and holding of a plurality of portable memory cards in an interior region defined by the card body. The memory card insertion and holding slots are laterally accessible through apertures in the first and second lateral edges. The first surface defines a plurality of notches adjacent to the first lateral edge for allowing removal of portable memory cards inserted in the memory card insertion and holding slots accessible via the first lateral edge. The second surface defines a plurality of notches adjacent to the second lateral edge for allowing removal of portable memory cards inserted in the memory card insertion and holding slots accessible via the second lateral edge.

17 Claims, 5 Drawing Sheets

U.S. PATENT DOCUMENTS

| | | | |
|---|---|---|---|
| 3,029,537 A | 4/1962 | Hopp et al. | |
| 3,294,222 A | 12/1966 | Hodgson | |
| D209,035 S | 10/1967 | Robert | |
| D209,629 S | 12/1967 | Brockway | |
| D214,819 S | 7/1969 | Goldberg | |
| 3,615,006 A | 10/1971 | Freed | |
| 3,749,230 A | 7/1973 | Foster | |
| 3,767,110 A | 10/1973 | Congleton | |
| D230,569 S | 3/1974 | Fallowfield et al. | |
| 3,891,070 A | 6/1975 | Montanari | |
| D237,419 S | 10/1975 | Lapins et al. | |
| 3,954,179 A | 5/1976 | Warmath | |
| D249,825 S | 10/1978 | Hasulak | |
| 4,141,400 A | 2/1979 | Mangan | |
| 4,331,194 A | 5/1982 | Lederer | |
| 4,345,607 A | 8/1982 | Contreras et al. | |
| D274,065 S | 5/1984 | Goutchat | |
| 4,454,889 A | 6/1984 | Contreras, Sr. | |
| D278,097 S | 3/1985 | Akiyoshi | |
| 4,518,080 A | 5/1985 | Ohlson | |
| 4,521,981 A | 6/1985 | Kasprzycki et al. | |
| D281,033 S | 10/1985 | Mohri | |
| D285,177 S | 8/1986 | Goetz | |
| D288,983 S | 3/1987 | Juhas et al. | |
| 4,697,698 A | 10/1987 | Holdener | |
| 4,700,840 A | 10/1987 | Haddock | |
| 4,703,853 A | 11/1987 | Byrns | |
| 4,746,045 A | 5/1988 | Schweim | |
| 4,778,047 A | 10/1988 | Lay | |
| 4,791,608 A | 12/1988 | Fushimoto | |
| 4,817,819 A | 4/1989 | Kelly | |
| 4,852,727 A | 8/1989 | Oberle | |
| 4,863,034 A | 9/1989 | Contreras, Sr. | |
| D308,913 S | 7/1990 | Kirchner | |
| D309,431 S | 7/1990 | Sheehan | |
| 4,974,983 A | 12/1990 | Givati | |
| D313,698 S | 1/1991 | Duffy | |
| D314,865 S | 2/1991 | Tuisku | |
| 5,038,926 A | 8/1991 | van der Toorn | |
| 5,050,623 A | 9/1991 | Yuhara et al. | |
| 5,069,333 A | 12/1991 | Chen | |
| 5,080,223 A | 1/1992 | Mitsuyama | |
| 5,094,396 A | 3/1992 | Burke | |
| 5,115,931 A | 5/1992 | Dubach | |
| D328,526 S | 8/1992 | Bianchi, Jr. et al. | |
| D332,684 S | 1/1993 | Melamed | |
| 5,183,153 A | 2/1993 | Linn | |
| D333,727 S | 3/1993 | Schurman | |
| 5,217,056 A | 6/1993 | Ritter | |
| D337,656 S | 7/1993 | Hostert | |
| 5,291,990 A * | 3/1994 | Sejzer | 206/748 |
| 5,293,995 A | 3/1994 | Iwaki et al. | |
| D347,728 S | 6/1994 | Taniyama | |
| D352,601 S | 11/1994 | Dallaire | |
| D358,055 S | 5/1995 | Long et al. | |
| 5,467,871 A | 11/1995 | DeField | |
| 5,493,105 A | 2/1996 | Desai | |
| 5,531,322 A | 7/1996 | Iwaki et al. | |
| 5,540,328 A * | 7/1996 | Kohtake | 206/308.1 |
| 5,544,438 A | 8/1996 | Fazekas | |
| D375,429 S | 11/1996 | Staack et al. | |
| 5,592,767 A | 1/1997 | Treske | |
| 5,620,271 A * | 4/1997 | Bergh et al. | 402/79 |
| D379,830 S | 6/1997 | Wasylyk | |
| 5,638,838 A | 6/1997 | Lombardi | |
| D380,493 S | 7/1997 | Sanders | |
| 5,692,438 A | 12/1997 | Kanai | |
| 5,697,498 A | 12/1997 | Weisburn et al. | |
| D390,357 S | 2/1998 | Rosen | |
| D391,760 S | 3/1998 | Zeller | |
| 5,727,681 A | 3/1998 | Li | |
| 5,740,624 A | 4/1998 | Baseley | |
| 5,740,938 A | 4/1998 | Hofmann et al. | |
| 5,749,464 A | 5/1998 | Cheris et al. | |
| 5,752,615 A | 5/1998 | Hofmann et al. | |
| 5,782,352 A | 7/1998 | Senda | |
| 5,791,474 A | 8/1998 | Hansen | |
| D397,870 S | 9/1998 | De Winter | |
| 5,826,719 A | 10/1998 | Chen | |
| 5,829,583 A | 11/1998 | VerWeyst et al. | |
| D403,152 S | 12/1998 | Parad | |
| 5,842,486 A | 12/1998 | Davis et al. | |
| 5,865,310 A | 2/1999 | Lee | |
| D406,192 S | 3/1999 | Schurman | |
| 5,878,878 A | 3/1999 | Wu | |
| 5,884,764 A | 3/1999 | Hartstone | |
| 5,901,764 A | 5/1999 | Ritter | |
| 5,929,427 A | 7/1999 | Harada et al. | |
| 5,938,242 A | 8/1999 | Ryan | |
| 5,941,375 A | 8/1999 | Kamens et al. | |
| D413,440 S | 9/1999 | Schurman | |
| D413,753 S | 9/1999 | Allsop | |
| 5,984,441 A | 11/1999 | Stokhuijzen | |
| D419,359 S | 1/2000 | Eguchi et al. | |
| 6,016,954 A | 1/2000 | Abe et al. | |
| 6,021,901 A | 2/2000 | Wolfe | |
| 6,029,811 A | 2/2000 | Heiligers | |
| 6,050,014 A | 4/2000 | Ohlson | |
| D425,294 S | 5/2000 | Haverstick | |
| 6,089,289 A | 7/2000 | Florjancic | |
| 6,120,228 A | 9/2000 | Exline | |
| 6,121,544 A | 9/2000 | Petsinger | |
| D431,719 S | 10/2000 | Mucarquer | |
| D431,881 S | 10/2000 | Gavin | |
| 6,155,410 A | 12/2000 | Davis | |
| 6,170,658 B1 * | 1/2001 | Dering | 206/308.1 |
| 6,170,753 B1 | 1/2001 | Takemura | |
| 6,186,403 B1 | 2/2001 | Ozbey et al. | |
| 6,199,559 B1 | 3/2001 | Nikolaus et al. | |
| 6,199,689 B1 | 3/2001 | Higuchi et al. | |
| 6,223,754 B1 | 5/2001 | Burdi et al. | |
| 6,230,885 B1 * | 5/2001 | Rochelo et al. | 206/308.3 |
| 6,266,905 B1 | 7/2001 | Forsythe et al. | |
| 6,275,383 B1 | 8/2001 | Böhm | |
| 6,283,298 B1 | 9/2001 | Seidler | |
| D456,201 S | 4/2002 | Hummell et al. | |
| 6,409,360 B2 | 6/2002 | Contant et al. | |
| 6,427,837 B1 | 8/2002 | Shields | |
| D468,199 S | 1/2003 | Lambelet, Jr. et al. | |
| D470,657 S | 2/2003 | Kawamura | |
| D470,658 S | 2/2003 | Chunn et al. | |
| 6,571,940 B2 | 6/2003 | Newman | |
| D477,143 S | 7/2003 | Nagata et al. | |
| D477,745 S | 7/2003 | Shamoon | |
| 6,594,154 B1 | 7/2003 | Brewer et al. | |
| D478,689 S | 8/2003 | Thorpe | |
| 6,648,166 B2 | 11/2003 | Levy | |
| D484,352 S | 12/2003 | Palmer | |
| 6,715,795 B2 | 4/2004 | Klure | |
| 6,739,452 B2 | 5/2004 | Rochelo | |
| 6,766,952 B2 | 7/2004 | Luu | |
| 6,782,998 B2 | 8/2004 | Koren | |
| D497,074 S | 10/2004 | Dardashti | |
| D497,508 S | 10/2004 | Dardashti | |
| 6,824,006 B2 | 11/2004 | Lambelet, Jr. | |
| 6,845,863 B1 | 1/2005 | Riley | |
| 6,848,577 B2 | 2/2005 | Kawamura et al. | |
| 6,863,537 B2 | 3/2005 | Pellizari | |
| 6,881,086 B2 | 4/2005 | Ohashi | |
| 6,934,159 B2 * | 8/2005 | Nogami | 361/726 |
| 6,947,290 B2 * | 9/2005 | Hirata | 361/741 |
| 6,971,520 B2 | 12/2005 | Fulda | |
| 6,991,155 B2 | 1/2006 | Burchette, Jr. | |
| D514,308 S | 2/2006 | Wahl et al. | |
| 7,052,295 B1 | 5/2006 | Lin | |
| 7,059,911 B2 | 6/2006 | Uchida et al. | |
| 7,066,386 B2 * | 6/2006 | Izumi | 235/381 |
| D525,069 S | 7/2006 | Farrar et al. | |
| 7,093,736 B2 | 8/2006 | Maietta et al. | |
| RE39,311 E | 10/2006 | Davis et al. | |
| D531,025 S | 10/2006 | Tanner | |
| 7,161,747 B2 | 1/2007 | Yang, Jr. | |
| 7,161,811 B2 | 1/2007 | Richter | |
| 7,163,152 B2 | 1/2007 | Osborn et al. | |
| 7,172,127 B1 | 2/2007 | Poland | |
| 7,191,899 B2 | 3/2007 | Garcia, Jr. et al. | |
| 7,275,678 B2 | 10/2007 | Hodsdon et al. | |

| | | |
|---|---|---|
| 7,293,647 B2 | 11/2007 | Wong et al. |
| 7,296,716 B2 | 11/2007 | Mayzel |
| 7,306,159 B1 | 12/2007 | Rochelo |
| 7,308,771 B2 | 12/2007 | Memelink |
| 7,325,744 B2 | 2/2008 | Porter |
| 7,337,979 B2 | 3/2008 | Takao |
| D565,842 S | 4/2008 | Falcone |
| D566,395 S | 4/2008 | Langer et al. |
| D567,032 S | 4/2008 | Gilbert |
| 7,350,642 B2 | 4/2008 | Bjerregaard et al. |
| D569,103 S | 5/2008 | Hoge et al. |
| D573,637 S | 7/2008 | Bharma |
| 7,469,787 B2 | 12/2008 | Yuhara |
| 7,475,816 B1 | 1/2009 | Rochelo |
| 7,520,425 B2 | 4/2009 | Clegg |
| 7,533,826 B2 | 5/2009 | Phillips |
| 7,556,205 B2 | 7/2009 | Tsang |
| 7,568,928 B2 | 8/2009 | Hou et al. |
| 7,578,446 B2 | 8/2009 | Yen |
| 7,583,514 B2 | 9/2009 | Zuo et al. |
| 7,614,548 B2 | 11/2009 | Schultz et al. |
| D613,293 S | 4/2010 | Sheba |
| 2001/0053634 A1 | 12/2001 | Camacho |
| 2002/0056652 A1 | 5/2002 | Kawamura et al. |
| 2002/0061672 A1* | 5/2002 | Burkart ............... 439/260 |
| 2002/0117243 A1 | 8/2002 | Koren |
| 2002/0129527 A1 | 9/2002 | Vaudreuil |
| 2003/0062275 A1 | 4/2003 | Rochelo |
| 2003/0085285 A1 | 5/2003 | Luu |
| 2003/0101630 A1 | 6/2003 | Garcia et al. |
| 2004/0026275 A1 | 2/2004 | Margetts et al. |
| 2004/0050939 A1 | 3/2004 | Mathias et al. |
| 2004/0058576 A1 | 3/2004 | Pellizari |
| 2004/0079656 A1 | 4/2004 | Hoogland |
| 2004/0124248 A1 | 7/2004 | Selker |
| 2004/0245128 A1 | 12/2004 | MacColl et al. |
| 2005/0040057 A1 | 2/2005 | Hoogland |
| 2005/0155879 A1 | 7/2005 | Hoogland |
| 2005/0167302 A1 | 8/2005 | Bjerregaard et al. |
| 2005/0180811 A1 | 8/2005 | Workman et al. |
| 2005/0199710 A1 | 9/2005 | Richter |
| 2005/0258068 A1* | 11/2005 | Chien ............... 206/701 |
| 2005/0279655 A1 | 12/2005 | Chen |
| 2006/0099855 A1 | 5/2006 | Richter et al. |
| 2006/0102728 A1 | 5/2006 | Miyazaki |
| 2006/0124747 A1 | 6/2006 | Rathbun et al. |
| 2006/0144751 A1 | 7/2006 | Tsang |
| 2006/0190738 A1 | 8/2006 | Takao |
| 2006/0208062 A1 | 9/2006 | Osborn et al. |
| 2007/0063329 A1 | 3/2007 | Liu et al. |
| 2007/0089999 A1 | 4/2007 | Decker et al. |
| 2007/0205115 A1 | 9/2007 | Lee |
| 2007/0284264 A1 | 12/2007 | Davis |
| 2008/0011628 A1 | 1/2008 | Lin |
| 2008/0156676 A1 | 7/2008 | Verma |
| 2008/0166898 A1 | 7/2008 | Hubert et al. |
| 2008/0272191 A1 | 11/2008 | Yen |
| 2009/0000969 A1 | 1/2009 | Walker et al. |
| 2009/0101255 A1 | 4/2009 | Long |

FOREIGN PATENT DOCUMENTS

| | | |
|---|---|---|
| EP | 0 831 412 A2 | 3/1998 |
| EP | 1 947 919 A2 | 7/2008 |

OTHER PUBLICATIONS

"G2-Mini SD Memory Card Case," http://www.inanycase.com/Merchant2/merchant.mv?Session_ID=48B04D6900084CE400..., p. 1 (Downloaded Aug. 23, 2008).

Photo of Memory Card Case, http://www.myaccessorymall.com/upload/Product/CZU003_zoom2.jpg, p. 1 (Downloaded Aug. 23, 2008).

Photo of Memory Card Case, Blue Nook, http://www.bluenook.com/display_image.asp?img=img%2Fproducts%2Fcase%5-Flowepro..., p. 1 (Downloaded Aug. 23, 2008).

Business Wire Commercial Photo of Memory Card Case, http://cache.daylife.com/imageserve/044R5es3zg5yO/610x.jpg, p. 1 (Downloaded Jul. 28, 2008).

Photo of Memory Card Case, http://www.altec-cs.com/media/produkte/flash_speicherk/micro-sd/microSD_2xAdapt_mr..., p. 1 (Downloaded Jul. 28, 2008).

Hardy, "SD/MMC Card Holder Review," Palm Infocenter, http://www.palminfocenter.com/news/3025/review-sd-mmc-card-holder/, pp. 1-6 (Feb. 22, 2002).

Images of Existing Memory Card Holders (Publication Date Unknown).

Notice of Allowance and Fee(s) Due for U.S. Appl. No. 29/310,553 (Dec. 15, 2009).

Final Official Action for U.S. Appl. No. 11/618,076 (Jun. 22, 2009).

International Search Report and Written Opinion for International Application No. PCT/US2007/088785 (Jun. 6, 2008).

* cited by examiner

000# MEMORY CARD HOLDER AND ORGANIZER FOR HOLDING AND ORGANIZING A PLURALITY OF PORTABLE MEMORY CARDS

RELATED APPLICATIONS

This application is a continuation-in-part of U.S. Design patent application Ser. No. 29/310,553, filed Aug. 26, 2008, now U.S. Pat. No. D,613,293, the disclosure of which is incorporated herein by reference in its entirety.

TECHNICAL FIELD

The subject matter described herein relates to storing portable memory cards. More particularly, the subject matter described herein relates to memory card holder and organizer for holding and organizing a plurality of portable memory cards.

BACKGROUND

Portable memory cards are currently being used to store data for digital cameras, mobile phones, music players, video game consoles, and other devices. As the memory chips used in the cards have increased in storage density, the size of the cards has decreased. One type of card that has a particularly small form factor is the micro secure digital (micro SD) card, currently used in mobile phones and slot media players. Because portable memory cards are small and because users may have many of such cards for the same or different devices, there exists a need for a device to store and hold such cards.

Current portable memory card holders typically use friction to hold memory cards in place. As friction does not provide a secure method for holding the cards, such cards can easily be lost. In addition, frictional holders do not provide locks or corresponding tactile or audible feedback to a user to indicate that a memory card is securely locked in place.

Currently, micro SD cards are sold and carried in single-card jewel cases so that they can be easily identified by the label on the respective jewel cases. These jewel cases are then carried in a larger case, which creates many layers between the user and the content.

Products exist to hold multiple portable memory cards. However, as stated above, current designs use friction to hold the cards and completely encase the cards within a flap or lid to prevent loss. Also, at least some current designs lack a convenient method for organizing and identifying cards, as there is little space on the cards or the card carriers to individually identify the content of each card.

Accordingly, in light of the difficulties, there exists a need for improved devices for storing and organizing portable memory cards.

SUMMARY

The subject matter described herein includes a memory card holder and organizer for holding and organizing a plurality of portable memory cards. The memory card holder and organizer includes a card body comprising first and second memory card covering members defining first and second opposite-facing surfaces and first and second opposite-facing lateral edges. The card body defines a plurality of memory card insertion and holding slots for insertion and holding of a plurality of portable memory cards in an interior region defined by the card body. The memory card insertion and holding slots are laterally accessible through apertures in the first and second lateral edges. The first surface defines a plurality of notches adjacent to the first lateral edge for allowing removal of portable memory cards inserted in the memory card insertion and holding slots accessible via the first lateral edge. The second surface defines a plurality of notches adjacent to the second lateral edge for allowing removal of portable memory cards inserted in the memory card insertion and holding slots accessible via the second lateral edge.

According to another aspect of the subject matter described herein, a memory card holder and organizer for holding and organizing a plurality of portable memory cards includes a card body comprising first and second memory card covering members defining first and second opposite-facing surfaces and first and second lateral edges. The memory card body defines a plurality of memory card insertion and holding slots for insertion and holding of a plurality of portable memory cards in an interior region defined by the card body. The memory card insertion and holding slots are laterally accessible through apertures in the first and second lateral edges. The memory card insertion and holding slots each include a cantilever beam that includes a first end that is fixed in position and that includes a second end that bends away from a lateral edge of a memory card during memory card insertion. The second end of the cantilever beam forms a wedge with a leading edge that engages with a protrusion on the lateral edge of the memory card during memory card insertion and thereby causes the cantilever beam to bend away from the lateral edge of the memory card and a trailing edge that engages with a slot in the lateral edge of the memory card at an oblique angle and forms a lock that can be disengaged though movement of the memory card in a direction opposite a direction of the memory card insertion.

According to another aspect of the subject matter described herein, a system for holding and organizing a plurality of portable memory cards is provided. The system includes a plurality of portable memory card holders, each portable memory card holder includes a card body comprising first and second memory card covering members defining first and second opposite-facing surfaces, first and second lateral edges, and first and second apertures through the card body. The card body defines a plurality of memory card insertion and holding slots for insertion and holding of a plurality of portable memory cards in an interior region defined by the card body. The memory card insertion and holding slots are laterally accessible through apertures in the first and second lateral edges. The memory card insertion and holding slots are configured to hold a plurality of portable memory cards in a common plane. The system further includes a ring binder for enclosing the plurality of memory card holders, the ring binder including first and second rings insertable through the apertures through the card body and further including first and second enclosing members coupled to the rings for enclosing the portable memory card holders.

BRIEF DESCRIPTION OF THE DRAWINGS

Preferred embodiments of the subject matter described herein will now be explained with reference to the accompanying drawings of which.

DETAILED DESCRIPTION

Figure 1A:
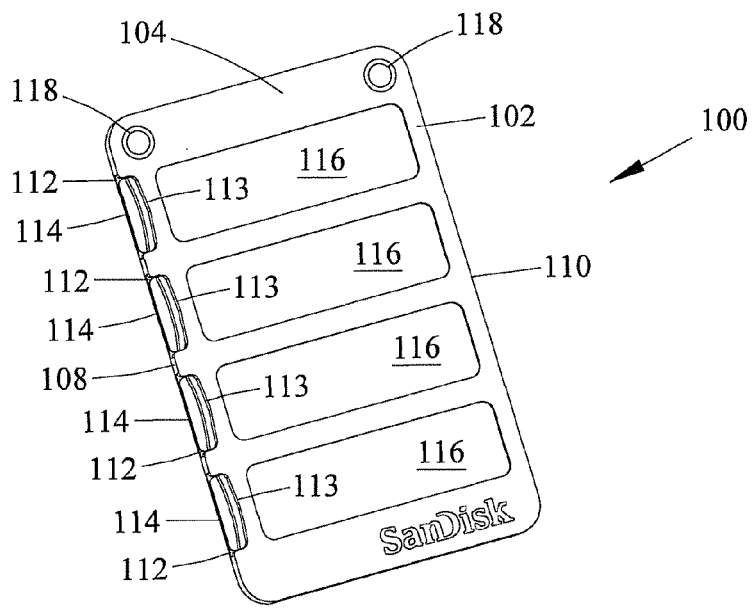
FIG. 1A is a front perspective view of a memory card holder and organizer according to an embodiment of the subject matter described herein.
Figure 1B:
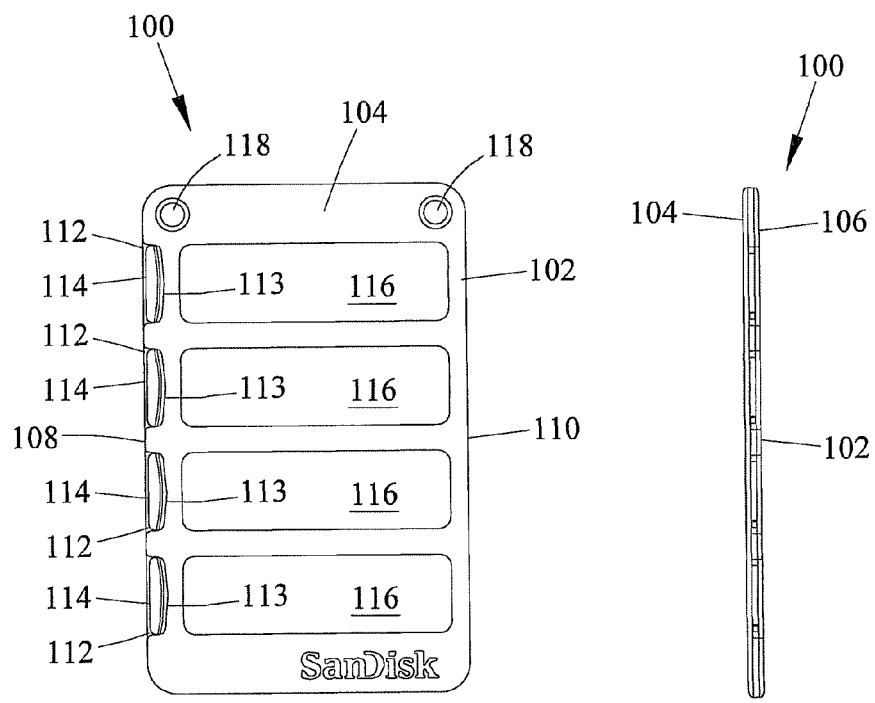
FIG. 1B is a front view of a memory card holder and organizer according to an embodiment of the subject matter described herein.
Figure 1C:
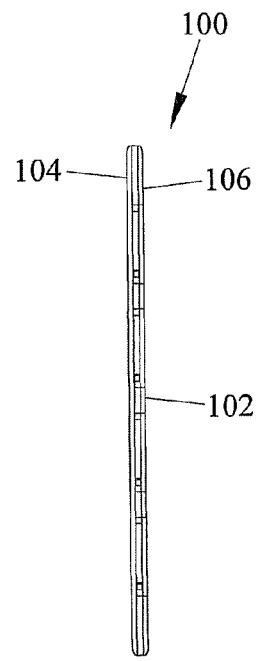
FIG. 1C illustrates a lateral view of a memory card holder and organizer according to an embodiment of the subject matter described herein.
Figure 1D:
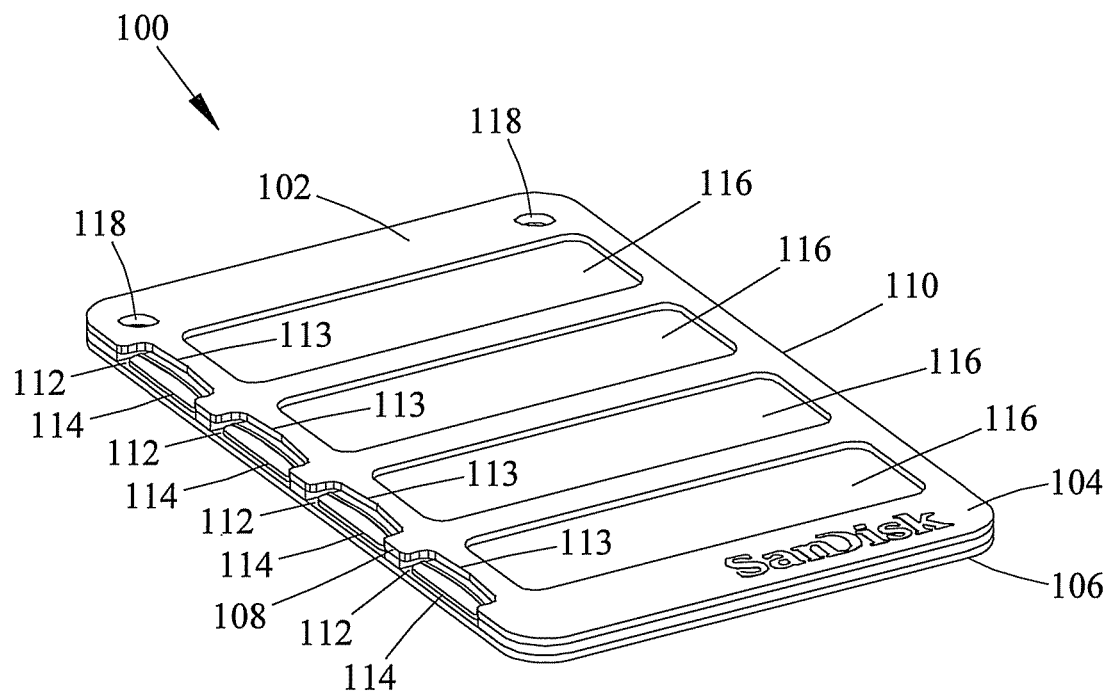
FIG. 1D is a top perspective view of a memory card holder and organizer and according to an embodiment of the subject matter described herein.

The subject matter described herein includes a memory card holder and organizer for holding and organizing of plurality of portable memory cards. FIGS. 1A-1E illustrate different views of a memory card holder and organizer according to an embodiment of the subject matter described herein. In FIGS. 1A-1E, a memory card holder and organizer 100 includes a card body 102 that includes first and second card covering members 104 and 106 that define opposite facing surfaces of card body 102 and opposite-facing lateral edges 108 and 110. Card body 102 defines memory card insertion and holding slots 112 for holding a plurality of memory cards 114 in an interior region defined by card body 102. In one embodiment, memory card insertion and holding slots 112 are configured to receive micro SD cards. However, memory card insertion and holding slots 112 may be configured to receive and hold any type of portable memory card including SD cards and multi-media cards (MMC) cards.

As illustrated in FIGS. 1A-1E, card covering members 104 and 106 define opposite facing surfaces that have surface areas that are substantially equal to the surface areas of corresponding surfaces of a credit card. In addition, memory card insertion and holding slots 112 are designed to hold memory cards in a common plane, reducing the thickness of card body 102 over designs that stack memory cards.

Figure 1E:
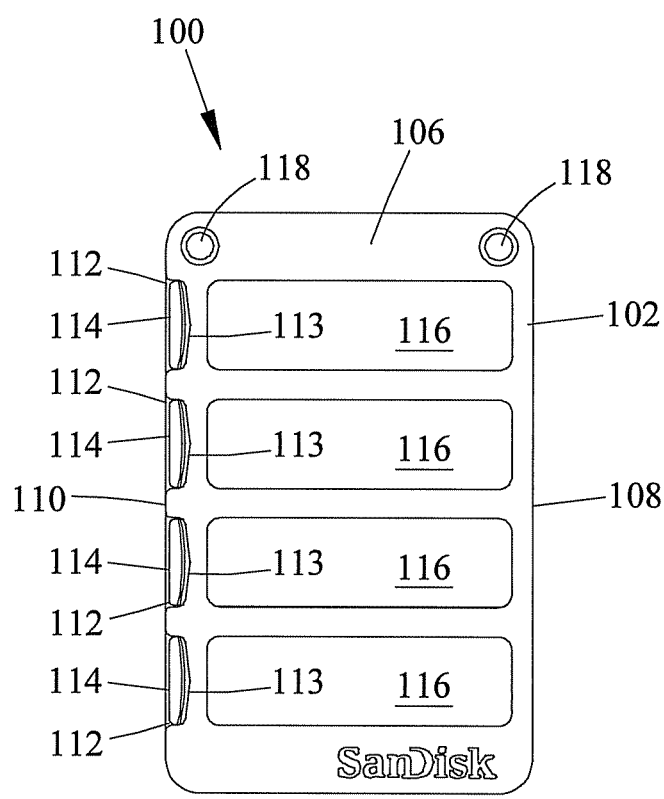
FIG. 1E is a rear view of a memory card holder and organizer according to an embodiment of the subject matter described herein.

According to one aspect of the subject matter described herein, card covering members 104 and 106 are substantially identical parts, decreasing manufacturing costs or memory card holder and organizer 100. For example, in FIG. 1B, card covering member 104 includes notches 113 adjacent to lateral edge 108. In FIG. 1E, when memory card holder and organizer 100 is flipped from the orientation of FIG. 1B, card covering member 106 also includes notches 113 adjacent to right lateral edge 110 (shown on the left side in FIG. 1E). Thus, because card covering members 104 and 106 include notches 113 that are accessible via opposite lateral edges on opposite sides of the card, card covering members 104 and 106 are substantially identical in structure and can be manufactured using the same manufacturing process.

According to another aspect of the subject matter described herein illustrated in FIGS. 1A-1E, each of card covering members 104 and 106 includes card identifying regions 116 that substantially overlay the card insertion and holding slots 112 for allowing the placement of card identifying information through labels or manual marking. Because card identifying regions 116 overlay a corresponding card slot, the content of the card in the corresponding card slot can be easily identified through visual examination of the corresponding card identifying region 116. In the illustrated example, each card identifying region 116 comprises a depression that extends inward from the plane of the outer surface of the corresponding card covering member 104 or 106.

According to another aspect of the subject matter described herein, card body 102 defines first and second apertures 118 through which rings are insertable for organizing a plurality of memory card holders and organizers. For example, apertures 118 may allow a plurality of memory card holder and organizers 100 to be inserted in a ring binder. Examples of ring binders suitable for holding a plurality of memory card holder and organizers will be described in detail below.

According to another aspect of the subject matter described herein, each card insertion and holding slot 112 may include a locking mechanism that holds a memory card in place in the slot through engagement with a lateral edge of an inserted memory card that can be disengaged through application of force in a direction opposite a card insertion direction. FIGS. 2A-2E illustrate an example of a locking mechanism according to an embodiment of the subject matter described herein. In this example, the locking mechanism includes a cantilever beam 200 that bends away from a lateral edge 202 of a memory card 114 as the card is inserted in a card slot 112, as illustrated in FIG. 2C. When memory card 114 is fully inserted within a card slot 112, cantilever beam 200 engages with a slot 204 defined in lateral edge 202 of memory card 114. Cantilever beam 200 includes a first end 206 that is fixed and about which cantilever beam 200 bends and a second end 208 opposite first end 206 that includes a wedge 210 that engages slot 204.

More particularly, wedge 210 includes a leading edge 213 that engages memory card structure 214 during card insertion to bend cantilever beam 200 away from memory card 114. Wedge 210 further includes a trailing edge 216 that engages slot 204 at an oblique angle such that the lock formed by wedge 210 and slot 204 can be disengaged through application of force in a direction opposite that of memory card insertion, as illustrated by arrows 218 in FIGS. 2D and 2E. The memory card insertion direction is illustrated by arrows 219 in FIGS. 2B and 2C. The locking mechanism disengagement illustrated in FIGS. 2D and 2E can be contrasted with conventional operational disengagement of a memory card lock, which requires the memory card to be pushed in (i.e., in the direction of insertion) to disengage the lock. In conventional memory card slot configurations, a structure engages memory card slot 204 at a right angle, requiring the memory card to be pushed in to disengage the lock. An advantage of the non-right-angle engagement of edge 216 with slot 204 is that applying force to the card in the direction of arrow 218 will not damage holder 100 or card 112. In devices where a holder engages slot 204 at a right angle, applying force in the direction of arrow 218 could damage card 112 and/or the holder. This type of damage could be likely to occur with less experienced memory card users, since it is natural to pull in an attempt to remove a memory card from its slot. Memory card holder and organizer 100 reduces the likelihood of such damage by providing for card removal by pulling the card out of its slot without requiring that the card be pushed inward to disengage the lock.

Figure 2A:
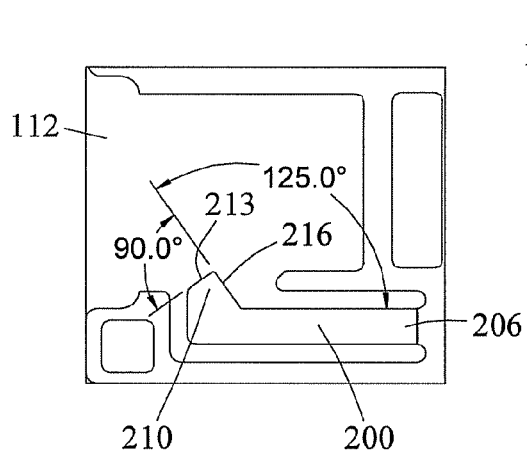
FIGS. 2A-2E respectively illustrate memory card insertion, locking, and removal according to an embodiment of the subject matter described herein.
Figure 2B:
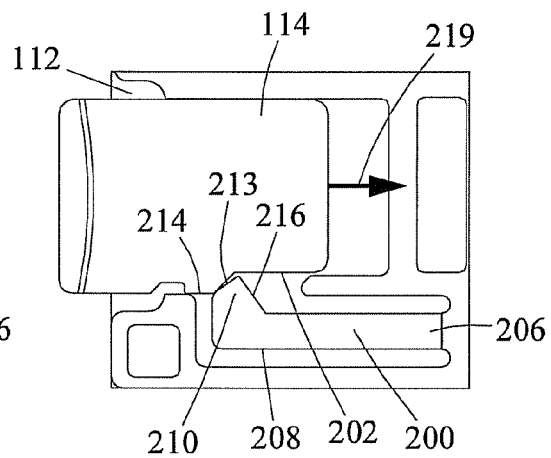
Figure 2C:
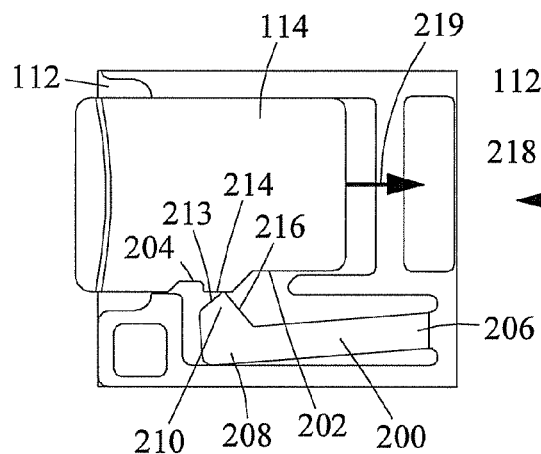

In FIG. 2A, it can be seen that trailing edge 216 of cantilever beam 200 forms an angle of 125° with respect to the arm of cantilever beam 200. It can also be seen that leading edge 213 forms an angle of 90° with trailing edge 216. These angles were chosen to control how the card feels when being inserted and removed from slot 204. Inserting the card uses little force but just enough force to communicate to the user that something is happening. Removing the card uses more force because the angle is steeper. These angles were chosen purposefully so that the card feels secure in the holder.

Figure 2D:
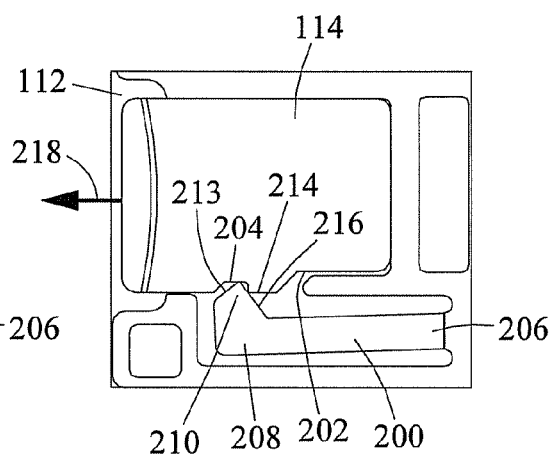
Figure 2E:
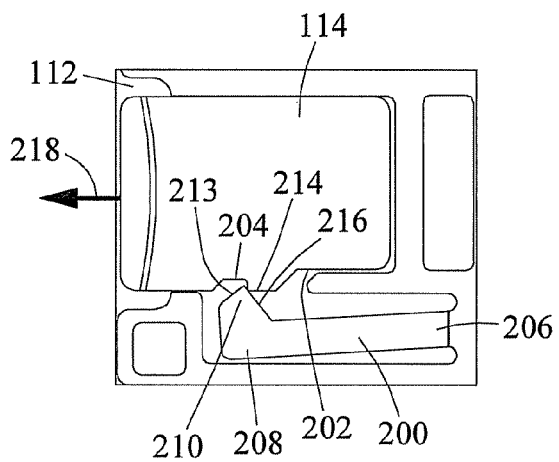

When memory card 114 is fully inserted within slot 112, as illustrated in FIG. 2D, the engagement of wedge 210 with slot 204 may produce audible and/or tactile feedback to the user to indicate that the lock is engaged. The audible and/or tactile feedback may include an audible click and corresponding tactile feedback that is communicated to the user through the memory card. This audible and/or tactile feedback can be contrasted with conventional frictional memory card holders that provide little or no audible or tactile indication to the user when a memory card is frictionally held in place.

Figure 3:
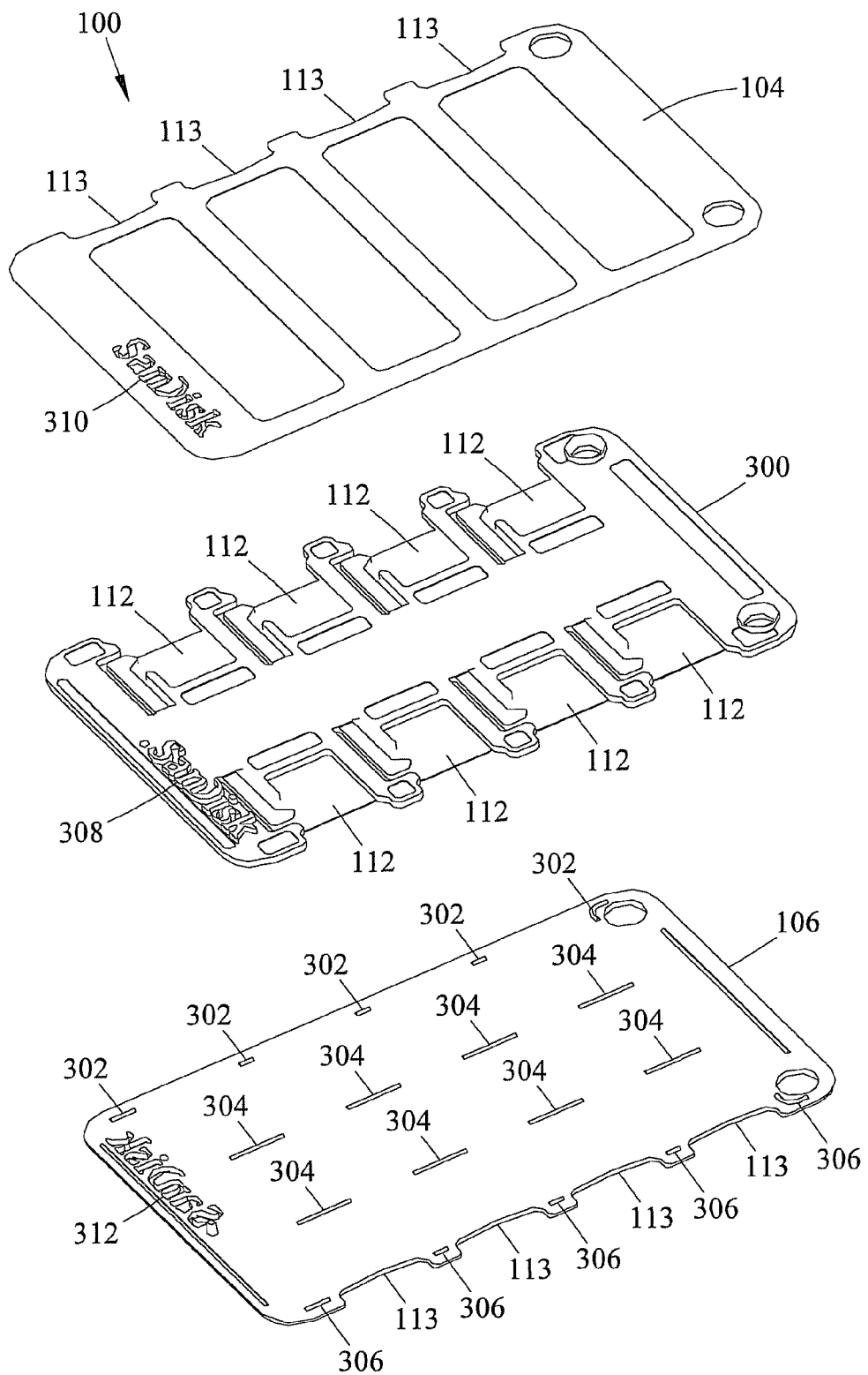
FIG. 3 is an exploded view of a memory card holder and organizer according to an embodiment of the subject matter described herein.

FIG. 3 is an exploded view of memory card holder and organizer according to an embodiment of the subject matter described herein. As illustrated in FIG. 3, card covering members 104 and 106 are substantially identical in structure. A memory card receiving member 300 is sandwiched between card covering members 104 and 106 and defines memory card insertion and holding slots 112. Thus, in one exemplary implementation, memory card holder and organizer 100 consists of only three parts, thus providing an implementation that has reduced manufacturing expense.

During such manufacture, card covering members 104 and 106 may be fastened together through any suitable means. In the illustrated example, each of card covering and holding members 104 and 106 includes columns of binding protrusions 302, 304, and 306 that extend outward from the corresponding surface of card covering members 104 and 106. When members 104, 300, and 106 are sandwiched together, binding protrusions 302, 304, and 306 may be ultrasonically welded to the corresponding location of the opposite card surface. In alternate implementation, an adhesive may be used to bind members 104, 106, and 300 together.

Manufacturing costs may be further reduced by manufacturing parts 104, 106, and 300 using a colored plastic resin, reducing the need to paint members 104, 106, and 300. For example, member 300 may be made from one color of plastic resin, and members 104 and 106 may be made of a different color of plastic resin to provide contrast between the parts. A logo 308 may extend outward from opposite surfaces of memory card receiving member 300. Logo 308 (shown on one side only) may extend through correspondingly shaped apertures 310 and 312 in memory card covering members 104 and 106.

Figure 4A:
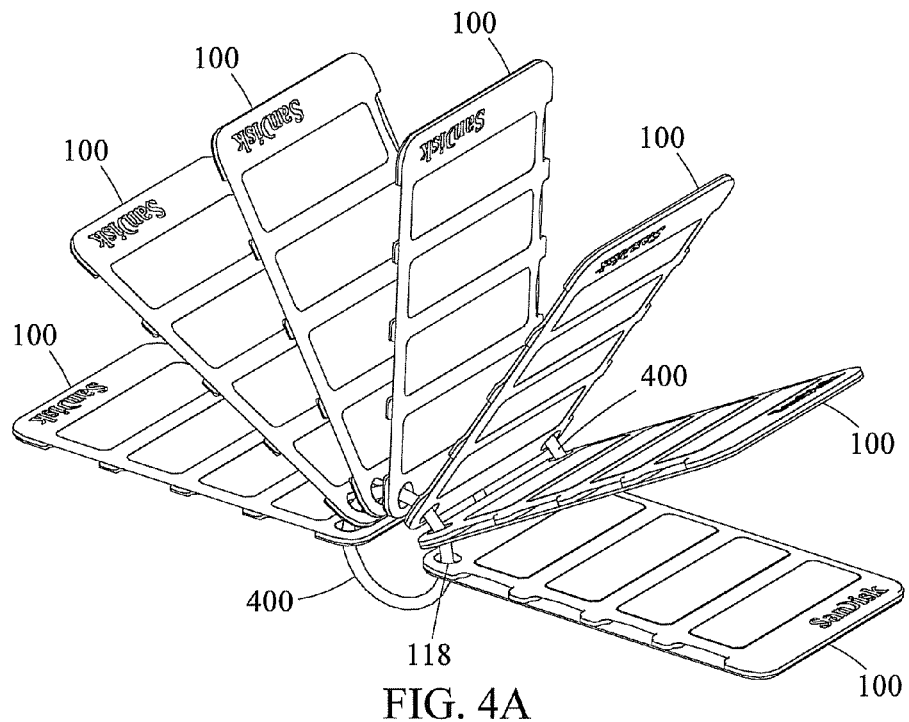
FIG. 4A is a perspective view of a plurality of memory card holders and organizers joined together by rings according to an embodiment of the subject matter described herein.
Figure 4B:
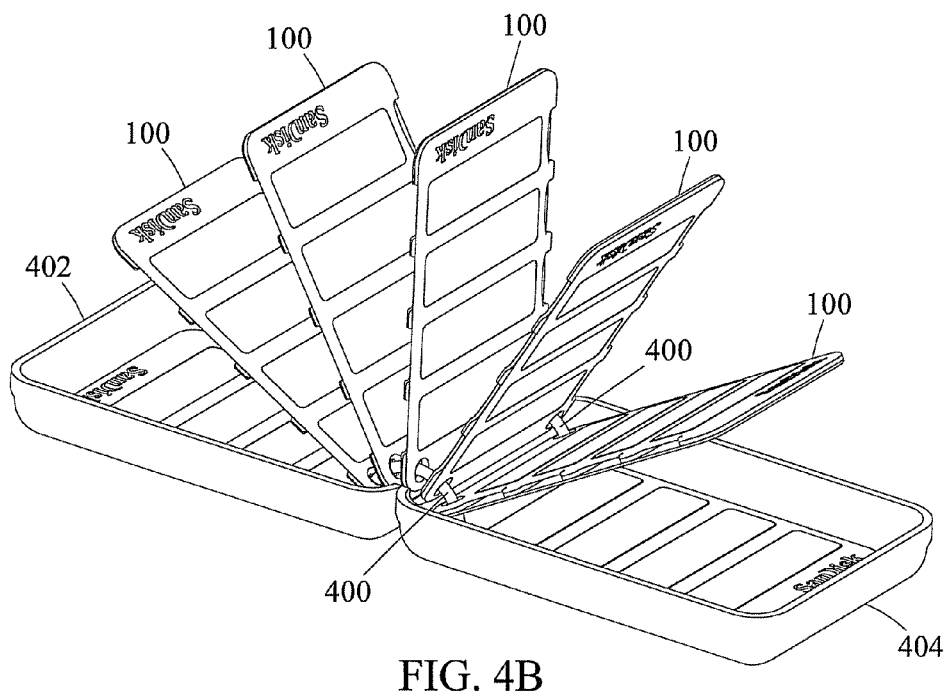
FIG. 4B is a perspective view of a ring binder for holding and enclosing a plurality of portable memory card holder and organizers according to an embodiment of the subject matter described herein.

As stated above, apertures 118 may allow a plurality of memory card holders to be bound together using a ring binder. FIGS. 4A and 4B illustrate such a configuration. In FIG. 4A, a plurality of memory card holders 100 is bound together using rings 400 that extend through apertures 118. In FIG. 4B, a ring binder including first and second clam shell enclosing members 402 and 404 enclose memory card holders 100 and are bound together using rings 400. Providing plural apertures for binding memory card holders and organizers 100 together via ring binders allows users to organize collections of memory cards. One example of such a collection may include a collection of portable memory cards that are encoded with digital music.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A memory card holder and organizer for holding and organizing a plurality of portable memory cards, the memory card holder and organizer comprising:
   a card body comprising first and second memory card covering members that form an enclosure for receiving a plurality of portable memory cards and that define first and second surfaces, each of which faces outward in a direction that is orthogonal to a direction of memory card insertion and opposite to the other, and first and second opposite-facing lateral edges, each of which faces a direction parallel to the direction of memory card insertion;
   the card body defining a plurality of memory card insertion and holding slots for insertion and holding of the plurality of portable memory cards in an interior region defined by the card body;
   wherein the memory card insertion and holding slots are laterally accessible through apertures in the first and second lateral edges;
   wherein the first surface defines a plurality of notches adjacent to the first lateral edge for allowing removal of portable memory cards inserted in the memory card insertion and holding slots accessible via the first lateral edge and wherein the second surface defines a plurality of notches adjacent to the second lateral edge for allowing removal of portable memory cards inserted in the memory card insertion and holding slots accessible via the second lateral edge, wherein the notches adjacent to the first lateral edge are recessed inwardly from the first lateral edge and the notches adjacent to the second lateral edge are recessed inwardly from the second lateral edge so that portable memory cards inserted in the notches adjacent to the first lateral edge are accessible from the first surface and portable memory cards inserted in the notches adjacent to the second lateral edge are accessible from the second surface and are substantially co-planar with portable memory cards inserted in the notches adjacent to the first lateral edge; and
   wherein the first and second card covering members are substantially identical in structure.

2. The memory card holder and organizer of claim 1 wherein the memory card insertion and holding slots each include a cantilever beam that includes a first end that is fixed in position and that includes a second end that bends away from a lateral edge of a memory card during memory card insertion.

3. The memory card holder and organizer of claim 2 wherein the second end of the cantilever beam forms a wedge with a leading edge that engages with a protrusion on the lateral edge of the memory card during the memory card insertion and thereby causes the cantilever beam to bend away from the lateral edge of the memory card and a trailing edge that engages with a slot in the lateral edge of the memory card at an oblique angle and forms a lock that can be disengaged though movement of the memory card in a direction opposite a direction of the memory card insertion.

4. The memory card holder and organizer of claim 1 wherein each of the memory card insertion and holding slots is configured to receive a micro secure digital (micro SD) card.

5. The memory card holder and organizer of claim 1 wherein each of the first and second opposite-facing surfaces has a surface area substantially equal to a corresponding surface of a credit card.

6. The memory card holder and organizer of claim 1 wherein each of the first and second surfaces includes a plurality of card identifying regions for receiving and displaying memory card identification information, wherein each card identifying region overlays a substantial portion of one of the memory card insertion and holding slots.

7. The memory card holder and organizer of claim 1 wherein the card body includes a memory card receiving member sandwiched between the first and second memory card covering members and that defines the memory card insertion and holding slots.

8. The memory card holder and organizer of claim 1 wherein the card body defines first and second apertures for receiving first and second rings of a ring binder for storing a plurality of card bodies.

9. The memory card holder and organizer of claim 8 comprising a ring binder including first and second rings insertable through the apertures of the card body and first and second enclosing members coupled to the rings for enclosing the card body and the rings.

10. A memory card holder and organizer for holding and organizing a plurality of portable memory cards, the memory card holder and organizer comprising:
a card body comprising first and second memory card covering members that form an enclosure for receiving a plurality of portable memory cards and that define first and second surfaces, each of which faces outward in a direction that is orthogonal to a direction of memory card insertion and opposite to the other, and first and second lateral edges, each of which faces a direction parallel to the direction of memory card insertion;
the card body defining a plurality of memory card insertion and holding slots for insertion and holding of the plurality of portable memory cards in an interior region defined by the card body;
wherein the memory card insertion and holding slots are laterally accessible through apertures in the first and second lateral edges;
wherein the memory card insertion and holding slots each include a cantilever beam that includes a first end that is fixed in position and that includes a second end that bends away from a lateral edge of a memory card during memory card insertion; and
wherein the second end of the cantilever beam forms a wedge with a leading edge that engages with a protrusion on the lateral edge of the memory card during the memory card insertion and thereby causes the cantilever beam to bend away from the lateral edge of the memory card and a trailing edge that engages with a slot in the lateral edge of the memory card at an oblique angle and forms a lock that can be disengaged though movement of the memory card in a direction opposite a direction of the memory card insertion and, wherein the first surface defines notches adjacent to the first lateral edge are recessed inwardly from the first lateral edge and the second surface defines notches adjacent to the second lateral edge are recessed inwardly from the second lateral edge so that portable memory cards inserted in the notches adjacent to the first lateral edge are accessible from the first surface and portable memory cards inserted in the notches adjacent to the second lateral edge are accessible from the second surface and are substantially co-planar with portable memory cards inserted in the notches adjacent to the first lateral edge, wherein the notches adjacent to the first lateral edge allow removal of portable memory cards inserted in the memory card insertion and holding slots accessible via the first lateral edge and wherein the notches adjacent to the second lateral edge allow removal of portable memory cards inserted in the memory card insertion and holding slots accessible via the second lateral edge, and wherein the first and second card covering members are substantially identical in structure.

11. The memory card holder and organizer of claim 10 wherein each of the memory card insertion and holding slots is configured to receive a micro secure digital (micro SD) card.

12. The memory card holder and organizer of claim 10 wherein each of the first and second opposite-facing surfaces as a surface area substantially equal to a corresponding surface of a credit card.

13. The memory card holder and organizer of claim 10 wherein each of the first and second surfaces includes a plurality of card identifying regions for receiving and displaying memory card identification information, wherein each card identifying region overlays a substantial portion of one of the memory card insertion and holding slots.

14. The memory card holder and organizer of claim 10 wherein the card body includes a memory card receiving member sandwiched between the first and second memory card covering members and that defines the memory card insertion and holding slots.

15. The memory card holder and organizer of claim 10 wherein the card body defines first and second apertures for receiving first and second rings of a ring binder for storing a plurality of card bodies.

16. The memory card holder and organizer of claim 15 comprising a ring binder including first and second rings insertable through the apertures of the card body and first and second enclosing members coupled to the rings for enclosing the card body and the rings.

17. A system for holding and organizing a plurality of portable memory cards, the system comprising:
a plurality of portable memory card holders, each, portable memory card holder comprising:
a card body comprising first and second memory card covering members that form an enclosure for receiving a plurality of portable memory cards and that define first and second surfaces, each of which faces outward in a direction orthogonal to a direction of memory card insertion and opposite to the other, first and second lateral edges, each of which faces a direction parallel to the direction of memory card insertion, and first and second apertures through the card body;
the card body defining a plurality of memory card insertion and holding slots for insertion and holding of the plurality of portable memory cards in an interior region defined by the card body;
wherein the memory card insertion and holding slots are laterally accessible through apertures in the first and second lateral edges; and
wherein the memory card insertion and holding slots are configured to hold a plurality of portable memory cards in a common plane and, wherein the first surface defines notches adjacent to the first lateral edge that are recessed inwardly from the first lateral edge and the second surface defines notches adjacent to the second lateral edge that are recessed inwardly from the second lateral edge so that portable memory cards inserted in the notches adjacent to the first lateral edge are accessible from the first surface and portable memory cards inserted in the notches adjacent to the second lateral edge are accessible from the second surface and are substantially co-planar with portable memory cards inserted in the notches adjacent to the first lateral edge and wherein the first and second card covering members are substantially identical in structure; and a ring binder for enclosing the plurality of memory card holders, the ring binder including first and second rings insertable through the apertures through the card body and further including first and second enclosing members coupled to the rings for enclosing the portable memory card holders.

* * * * *